(12) United States Patent
Habetha

(10) Patent No.: US 8,081,575 B2
(45) Date of Patent: Dec. 20, 2011

(54) SYSTEM AND METHOD FOR DYNAMIC ADAPTATION OF DATA RATE AND TRANSMIT POWER WITH A BEACONING PROTOCOL

(75) Inventor: Joerg Habetha, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 829 days.

(21) Appl. No.: 11/577,537

(22) PCT Filed: Oct. 19, 2005

(86) PCT No.: PCT/IB2005/053424
§ 371 (c)(1),
(2), (4) Date: Apr. 19, 2007

(87) PCT Pub. No.: WO2006/043242
PCT Pub. Date: Apr. 27, 2006

(65) Prior Publication Data
US 2008/0137577 A1    Jun. 12, 2008

Related U.S. Application Data

(60) Provisional application No. 60/620,448, filed on Oct. 20, 2004, provisional application No. 60/663,670, filed on Mar. 21, 2005.

(51) Int. Cl.
*H04J 3/14* (2006.01)
(52) U.S. Cl. ........ 370/252; 370/332; 370/445; 455/450; 455/452.2; 455/63.1

(58) Field of Classification Search .................. 370/252, 370/332, 442, 337, 445, 338, 350, 450, 452, 370/328, 446; 455/62, 450, 452.2, 515, 63.1; 375/329, 229
See application file for complete search history.

(56) References Cited

U.S. PATENT DOCUMENTS 7,634,275 B2 * 12/2009 Odman .................... 455/450
2002/0172186 A1 11/2002 Larsson

OTHER PUBLICATIONS

IEEE STD 802.15.3 Wireless Medium Access Control and Physical Layer Specifications for High Rate Wireless Personal Area Networks (WPANs) Part 15.3. pp. 1-208.

* cited by examiner

*Primary Examiner* — Huy Vu
*Assistant Examiner* — Dady Chery
(74) *Attorney, Agent, or Firm* — Larry Liberchuk

(57) ABSTRACT

A system, apparatus, and method are provided for dynamically selecting the data rate and/or transmit (TX) power. The method consists of devices periodically transmitting beacon frames in which they include data rate and/or TX power feedback for all senders of data streams, of which the devices are a receiver. The feedback may consist of recommended values for data rate and/or TX power or of channel state information. A sender chooses data rate and/or transmit power considering the feedback from the one or several receivers of the stream. The invention especially relates to systems based on an Ultra Wide Band Medium Access Control Protocol.

20 Claims, 9 Drawing Sheets

| :3 | ... | 3 | 2 | 1 | 1 | 2 | 1 | 1 |
|---|---|---|---|---|---|---|---|---|
| 607.N | ... | 1 607.1 | 606 | 605 | 604 | 603 | (=6+3_N) 602 | 601 |

FIG. 6A

| b15-b12 | b11-b8 | b7-b5 | b4-b2 | b1-b0 |
|---|---|---|---|---|
| 635 | 634 | 633 | 632 | 631 |

FIG. 6B

| :3 | ... | 3 | 2 | 2 | 1 | 1 |
|---|---|---|---|---|---|---|
| 607.N | ... | 1<br>607.1 | 606 | 603 | (=4+3_N)<br>602 | 601 |

FIG. 7A

| b15-b14 | b13-b12 | b11-b8 | b7-b5 | b4-b2 | b1-b0 |
|---|---|---|---|---|---|
| 702 | 701 | 634 | 633 | 632 | 631 |

FIG. 7B

| :4 | 7 | 4 | 8 5 | 8 | 16 | 8 | 8 |
|---|---|---|---|---|---|---|---|
| 807 | 806 | 805 | 804 | 803 | (=7 OCT.) 802 | 801 |

| | 2 | 2 | 4 | 16 | 8 | 8 |
|---|---|---|---|---|---|---|
| 903 | 902 | 901 | 806 | 803 | (=5 OCT.) 802 | 801 |

| :1 | 1 | 3 | | 3 |
|---|---|---|---|---|
| 801 | (=2+5xN) 802 | 1 1100 | ... | |

| :B23-B20 | B19-B16 | B15-B0 |
|---|---|---|
| 805 | | 1200 |
| | 804 | |

FIG. 12

SYSTEM AND METHOD FOR DYNAMIC ADAPTATION OF DATA RATE AND TRANSMIT POWER WITH A BEACONING PROTOCOL

The present invention relates to a protocol for ultra wideband (UWB) medium access control (MAC). More particularly, the present invention relates to an enhanced protocol for UWB MAC. Also the present invention relates to an enhanced protocol for UWB MAC comprising a distributed reservation protocol (DRP). The invention also relates to any wireless system that uses a MAC protocol, in which devices are sending a beacon.

Wireless personal area networks (WPANs) are intended for communication on short links of up to ten or several tens of meters and do not rely on an installed infrastructure in most cases. Nevertheless some existing WPANs like Bluetooth or IEEE 802.15.3 rely on a central unit like the "Piconet Coordinator". This makes topology management quite complex in ad hoc scenarios, in which no infrastructure is available. A distributed MAC protocol eliminates the need for a network infrastructure by distributing functions across all devices, i.e., nodes. There is no access point or central coordinator for a decentralized wireless personal area network (WPAN). That is, all devices in a decentralized WPAN exhibit the same protocol behavior and have the same hardware/software capabilities. Asynchronous and isochronous data transfers are supported in most WPANs. Whereas in Bluetooth and IEEE 802.15.3 isochronous transfer is organized by the piconet coordinator, it is handled in a fully distributed manner in the present invention.

One MAC protocol currently being prepared for standardization is the Multi-Band OFDM Alliance (MBOA), see *MultiBand OFDM Alliance (MBOA) MAC Wireless Medium Access Control (MAC) Specification For High Rate Wireless Personal Area Networks (WPANs)*, Draft 0.61, Aug. 3, 2004.

According to the MBOA standard, all devices are required to regularly transmit a beacon 105 (see FIG. 1), in order to maintain coordination between communicating devices. A beacon 105 provides the basic timing for the network and transmits information regarding isochronous reservations, sleep periods, etc. All devices announce their isochronous airtime utilization via beacon transmission, recognize neighboring devices' airtime utilization by receiving beacons from them, and respect other devices' airtime utilization prior to transmitting/receiving data.

This makes the distributed MAC protocol very well suited for ad hoc applications and peer-to-peer networking. Furthermore, the reservation of the medium by the devices on which the distributed MAC is based eliminates sensing and collision times on the medium. Data throughput is increased and mesh networking support is significantly improved.

Owing to the distribution of medium reservations, real-time streaming support can be guaranteed. A very efficient real-time streaming protocol enables the controlled delivery of real-time data, such as audio and video. Sources of data can include both live data feeds, such as live audio and video, and stored content, such as pre-recorded events.

According to the MBOA MAC standard, time is divided into superframes 100 of length 65,536 [usec], which are composed of 256 Media Access Slots (MAS) where each MAS length is 256[usec]. MAS slots are numbered from 0 to 255. Several slot types are defined depending on how the MAS are utilized by the device or devices nearby.

Devices periodically send a beacon frame to announce their presence, medium reservations, sleep periods, etc. Beacons of one or several devices are grouped into one or several contiguous "beacon periods" (BP) 102 (in the latest version of the MBOA standard only a single beacon period per superframe). Before communication can be established, a device must create its own beacon period or join an existing beacon period. For each beacon period 102, a certain number of consecutive MAS slots are utilized as beacon slots, where all the devices transmit their beacons 105. Each MAS comprises 3 beacon slots. The length of the BP is dynamic and adapts to the number of occupied beacon slots in the BP. The start time of a superframe 100 is determined by the beginning of a beacon period 101 and is defined as a beacon period start time (BPST) and MAS slots are numbered relative to this starting time.

Many modern communication systems allow for a dynamic adaptation of the Modulation and Coding Scheme (MCS) as well as of the transmit power. A common problem is the appropriate selection of the MCS and transmit power on the sender side.

The present invention addresses the problem of appropriate MCS and transmit (TX) power selection on the transmitter side and provides a very powerful and efficient solution based on a beaconing concept.

An adaptation of the MCS and/or TX power is frequently needed because of varying channel conditions in wireless systems (but also wired systems to a certain extent). A variation in the channel conditions can be due to interference from other devices in the same or different networks, channel fading e.g. due to terminal mobility, varying distance between sender and receiver, etc. The difficulty in the appropriate selection of MCS and TX power is that the channel conditions on the receiving side should determine the selection, as the receiver has to decode received data correctly. However, the sender is in general only aware of its own channel conditions but not the channel conditions on the receiver side. There are two basic approaches to this problem.

The first approach is that the sender estimates the channel conditions on the receiver side. This estimate could, e.g., be based on the number of positive acknowledgements received from the receiver, rsp. the number of frames in error. It could also be based on the Received Signal Strength (RSS) of frames received from the receiver or the Signal to Noise Ratio (SNR) of such frames on the sender side, which presumes a certain channel reciprocity or at least correlation between the sender-to-receiver and receiver-to-sender direction. These estimation approaches are feasible but have the disadvantages to be quite slow or not very accurate.

The second type of approach is that the receiver sends explicit feedback to the sender regarding the channel conditions on the receiver side or that the receiver even recommends MCS and TX power. Such an approach is in general more accurate and faster than the estimation approach. On the other hand, the explicit feedback creates more overhead than the estimation approach.

The present invention enables explicit feedback from the receiver while at the same time keeping the signalling overhead minimal. Accordingly, every device transmits a beacon frame, in which it includes feedback for ongoing transmissions, in which the device is a receiver. This feedback can be either incremental or full feedback on the MCS and TX power selection or just include channel information from the receiver side.

Incremental feedback regarding MCS and TX power selection means that the receiver indicates in its beacon whether to increase or decrease (or keep unchanged) the data rate (rsp. MCS) and TX power. This increase or decrease is defined in steps. Upon receiving this indication the sender may follow this recommendation and increase/decrease/keep unchanged the MCS and/or TX power by one (or several) steps. The beacon includes separate recommendations for MCS and TX power. The sender may also apply some form of sliding average scheme and may follow receiver recommendations only with a certain delay.

Full feedback regarding MCS and TX power selection means that the receiver includes in its beacon a specific recommendation which MCS and TX power the sender should use. As only a set of MCS is defined in a standard, each MCS may be designated by a code, rsp. combination of bits. The recommended TX power level may also signalled by means of a code (if the TX power is defined in steps) or as an absolute value. Upon reception of the full feedback the sender may accept this recommendation and change the MCS and/or power to the recommended value.

Feedback, which only includes channel information from the receiver side, gives more flexibility to the sender but is probably also less efficient. The channel information could, e.g., include the RSS or SNR of the packets received from the sender or the Packet Error Ratio (PER) or other related information. Upon reception of channel information feedback, the sender chooses an appropriate MCS and TX power on its own based on the information received.

In the MBOA MAC protocol a beacon contains several different types of Information Elements (IE), some of which will be described in the detailed description of this invention below. According to the present invention the feedback is either transmitted as part of an existing IE, which is re-defined appropriately, or it is transmitted in newly defined additional IEs.

In the case where the feedback is transmitted as part of an existing IE, it is included in the so-called "Distributed Reservation Protocol (DRP) IE". This DRP IE is used by sender and receiver of a transmission to reserve the medium prior to a DRP transmission, as well as to inform each other about the position of the transmission in the superframe. All devices have to decode DRP IEs included in the beacons of other devices and have to respect the reservations that are announced therein. The DRP IE is very suited for the inclusion of feedback information, as it already relates to a specific link between two (unicast) or multiple (multicast) devices. According to the present invention the DRP IE is modified to include either incremental, full or channel state feedback for MCS and/or TX power.

In the case where the feedback is transmitted in separate IEs, the present invention foresees that either separate IEs for MCS and TX power are defined or that both types of feedback are integrated into a single IE. The advantage of additional IEs is that not only feedback for DRP transmissions can be given but also for the second type of data transmissions according to the MBOA standard based on random access (see detailed description below).

The invention provides many additional advantages that are evident from the description, drawings, and claims.

FIG. 6A illustrates a first example of the Distributed Reservation Protocol Information Element (DRPIE) format;

FIG. 6B illustrates a first example of the DRP Control field inside the DRPIE;

FIG. 7A illustrates a second example of the Distributed Reservation Protocol Information Element format;

FIG. 7B illustrates a second example of the DRP Control field inside the DRPIE;

FIG. 8 illustrates a first example of the Link Feedback Information Element (LFIE) format;

FIG. 9 illustrates a second example of the Link Feedback Information Element (LFIE) format;

FIG. 11 illustrates a third example of the Link Feedback Information Element (LFIE) format; and FIG. 12 illustrates a link field format.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
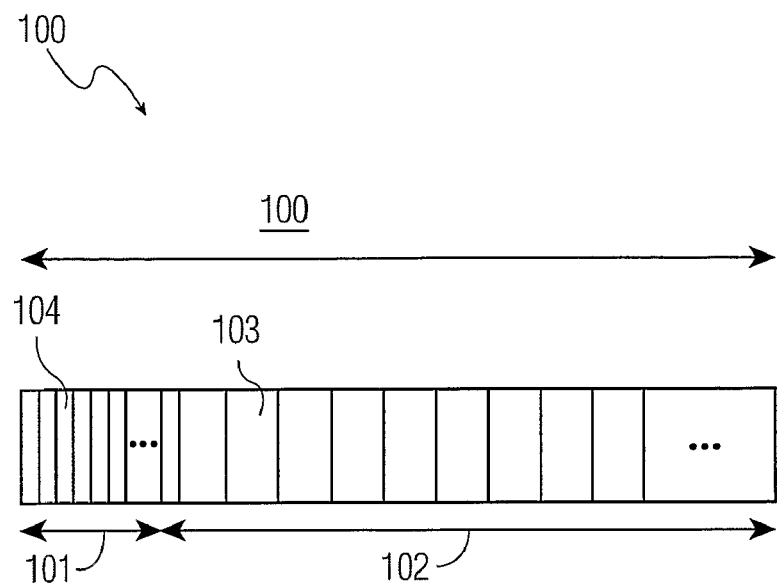
FIG. 1 illustrates an overall superframe layout.

In the distributed MAC protocol, time is divided into superframes 100, as illustrated in FIG. 1. At the beginning of each superframe 100 there is a beacon interval/phase also known as a beacon period (BP) 101 that is followed by a data transmission interval/phase 102. In the most general superframe structure, a superframe can also contain more than one BP. The superframe is furthermore divided into a certain number of Medium Access Slots (MAS) 103. Inside the BP 101 the MAS 103 are sub-divided in a certain number of beacon slots 104, e.g. 3 beacon slots per MAS 103. The BP 101 can contain a variable number of MAS 103, rsp. beacon slots 104 but cannot be longer than a certain maximum length. Beacon slots and MAS are separated by guard times to account for synchronization inaccuracies and transmission delays.

Figure 2:
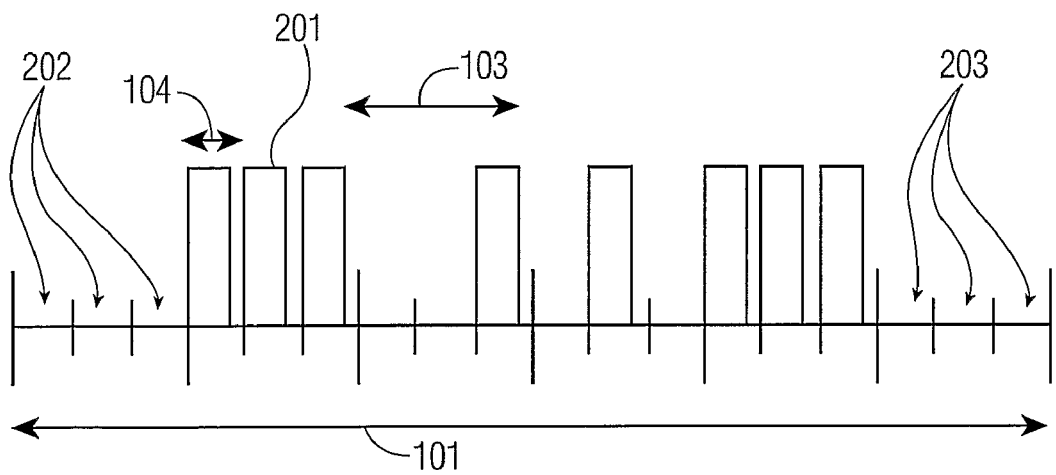
FIG. 2 illustrates the structure of a Beacon Period.

The structure of the BP 101 is illustrated in FIG. 2. During a BP 101 all devices that are either in an active state or in a standard power-save mode transmit their own beacon 201 in one of the beacon slots 104. A BP 101 may contain empty beacon slots 104 as well as special purpose slots e.g. at the beginning 202 or end 203 of the BP.

Figure 3:
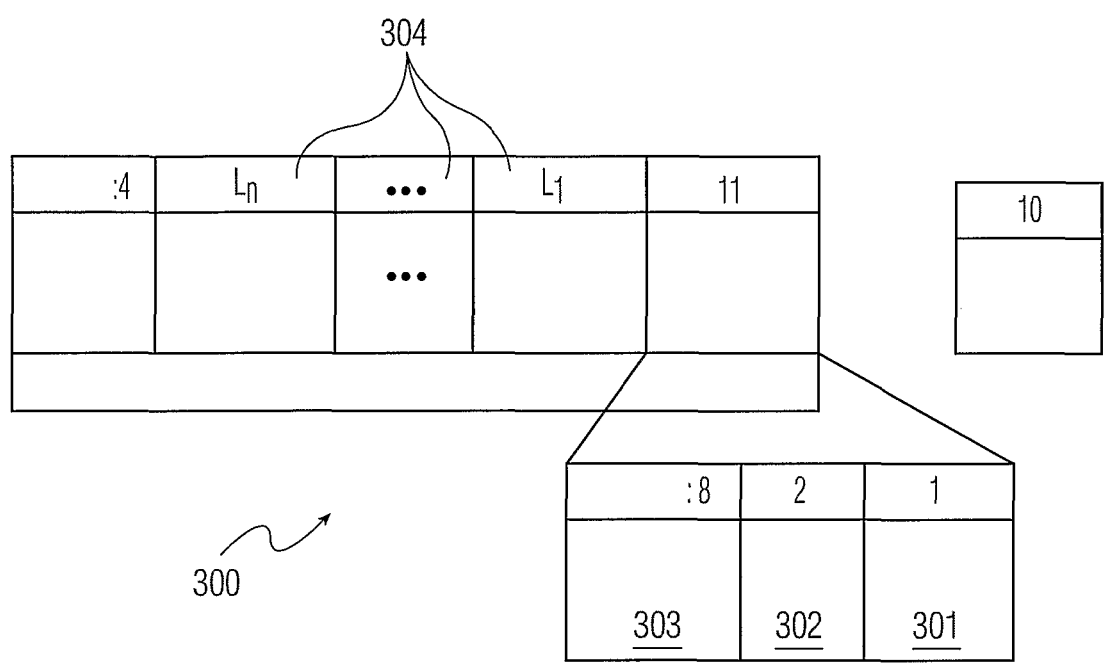
FIG. 3 illustrates the format of a beacon frame.

FIG. 3 shows the format of a beacon frame 201, which has to be read from right to left. The frame body of a beacon 103 comprises the following fields and information elements (IE), as illustrated in FIG. 3:

Slot Number 301;
Device Identifier 302;
MAC address 303; and
a certain number of Information Elements (IEs) 304;

The Slot Number 301 is the slot in which the beacon is transmitted and represents the order of the beacons. With a Slot Number field size of 8 bits, 256 devices can be supported simultaneously.

The Device ID 302 is a relatively short ID (of e.g. 16 bit) that is derived e.g. from the 48-bit (or 64-bit) MAC address of the device (or randomly chosen) and has the purpose to save overhead when addressing the device.

The MAC address 303 is the 48-bit (or 64-bit) full MAC address of the device.

The Information Elements (IEs) 304 can be of different types. The type of information element is identified by an Information Element Identifier (ID) 601. Only a modified Distributed Reservation Protocol Information Element (DRPIE) 600 as well as the new IEs for MCS and TX power feedback are described in more detail in this invention, see FIG. 6.

Figure 4:
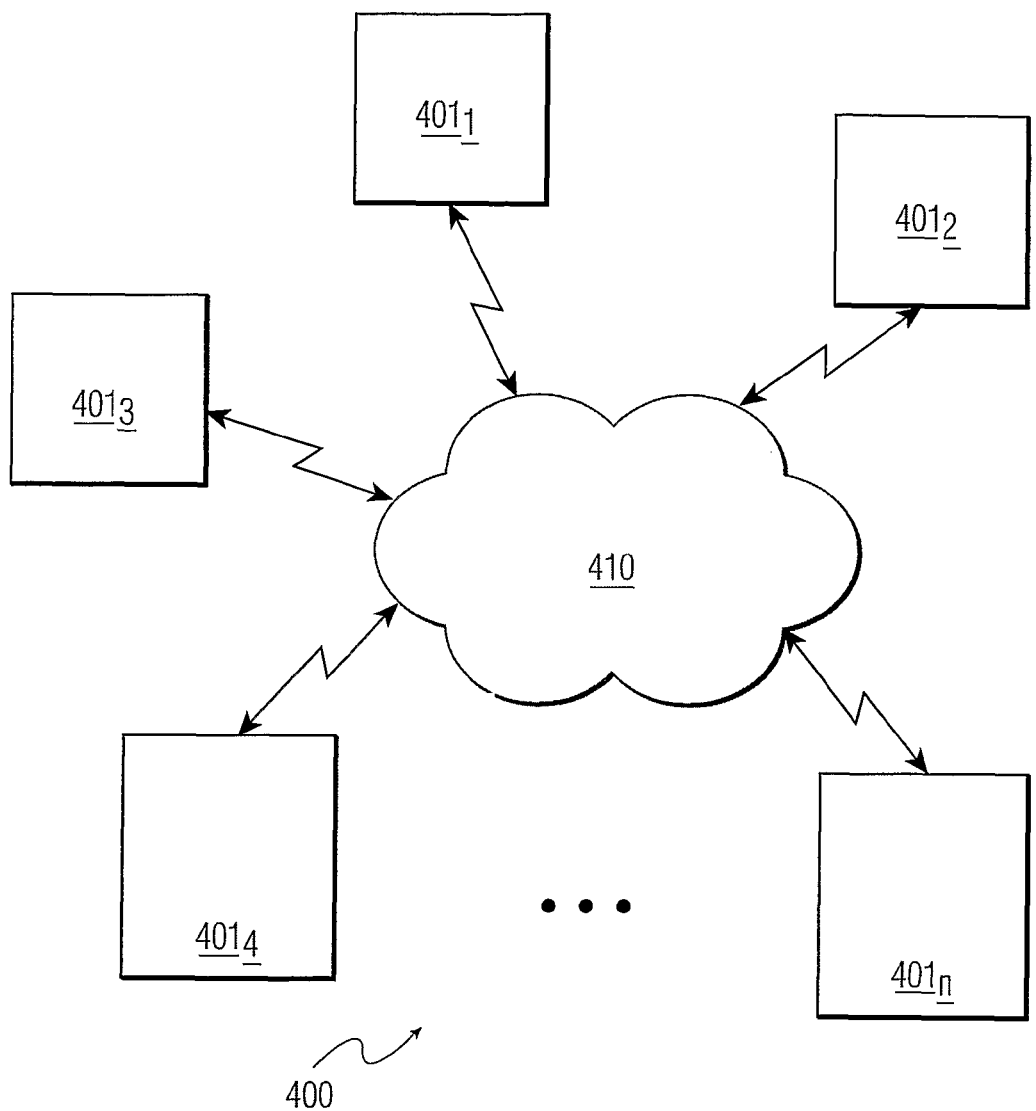
FIG. 4 illustrates a wireless network of devices operating according to the present invention.

FIG. 4 illustrates a representative wireless personal area network 400 whereto embodiments of the present invention are to be applied. The networks include a plurality of wireless personal communication devices 401. In the traditional approach, each device 401 can join any ad hoc network within its radio range 402 and therefore can participate in more than one BP.

Figure 5:
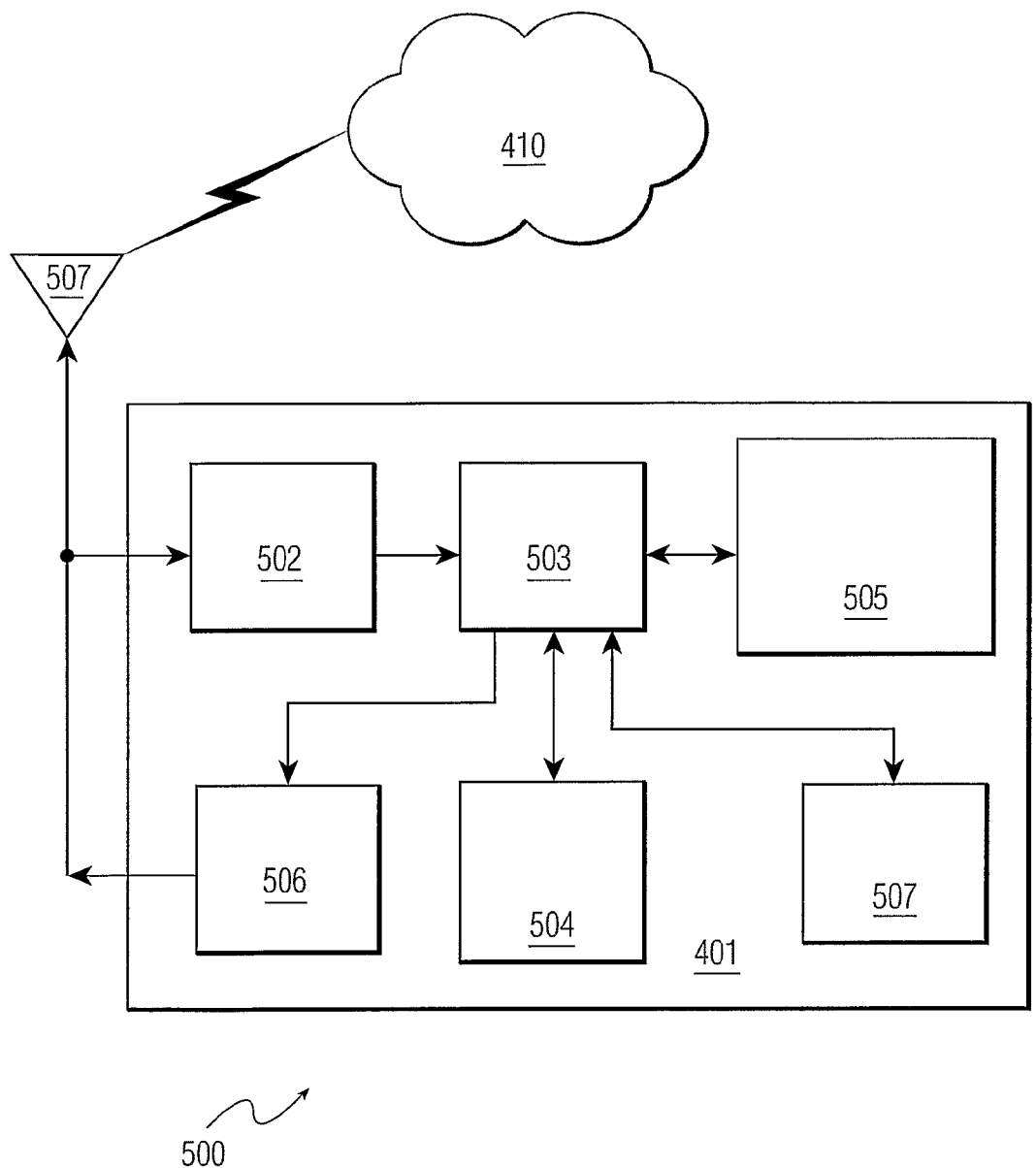
FIG. 5 illustrates some building blocks of a device according to the present invention.

Each wireless device 401 within the WPAN 400 shown in FIG. 4 may include a system including an architecture that is illustrated in FIG. 5. As shown, each wireless device 401 may include an antenna 506 coupled to a receiver 502 that communicates over the wireless medium 510. The devices 401 each further comprise a processor 503 and a Beacon Processing Module 504. For example, in a device the processor 503 is configured to receive from the receiver 502 a beacon frame 201 including one or more Information Elements having corresponding beacon positions and to process the beacon frame 201 using the Beacon Processing Module 504 to determine, e.g., the devices of the beacon period and their characteristics and store them in a local storage 507. In a device 401, the processor 503 is further configured to use an MCS and/or TX Power Selection and Feedback Module 505 to determine the appropriate MCS and TX power for a certain link.

After a device 401 is powered up, it scans for beacons 201. If the device 401 detects no beacons 201 after the scan, before it is ready to transmit or receive MAC frames, it sends a beacon to create a BP 101. This sets the reference start of the BP and the superframe, which may be several beacon slots before the transmitted beacon. The resulting empty slots 202 may be used by other devices for any other purpose known to one of skill in the art. The device 401 continues to send a beacon 103 after each successive superframe 100 until it detects a beacon collision as described below.

A beacon frame includes information regarding the length of the beacon period. This length information may point beyond the last occupied beacon slot. The resulting beacon slots 203 may also be used for special purposes. One such purpose may be the expansion of the beacon period to accommodate additional devices.

If the device 401 detects one or more beacons 201, it does not create a new BP 101. Instead, the device determines its current beacon group from the received beacons 201. The device's current beacon group comprises the devices from which the device 401 received at least one beacon frame 201 during the last mLostBeacons superframes 100. If the device 401 receives beacons that are located in different beacon periods, it selects one (or several) periods, in which to send its own beacon before communicating with another device.

The start of the BP 101 coincides with the start of the associated superframe 100 and can be deduced from the beacon slot number included in a beacon. The end of the BP 301 is also announced in a beacon and is given by the last occupied beacon slot or MAS plus eventually a certain number of special purpose slots 203.

If two devices transmit a beacon 201 in the same beacon slot 104, a beacon collision occurs. The latter can be due to the fact that two devices have randomly chosen the same beacon position in a BP 101 or due to a hidden terminal problem in mesh network scenarios. The beacon collision has to be detected and resolved because other devices may not be able to decode the two colliding beacons. Devices detect beacon collisions by scanning beacon slots as well as by decoding the Beacon Period Occupancy Information Element (BPOIE) in the beacons of other devices. The BPOIE is an IE that every device includes in its beacon and which indicates the occupancy of the beacon slots in the BP 101 along with the Device Identifiers (DEVID) of the devices that occupy the respective beacon slots 104. A device detects a beacon collision if a DEVID different from its own DEVID is received in a BPOIE of another device for the beacon slot 104, in which the device sends its own beacon. If a beacon collision is detected the device has to switch to a different empty beacon slot. Unless a beacon collision is detected, a device sends its beacon 201 in the same beacon slot 104 in subsequent superframes 100.

Two different medium access schemes are defined for data transmission: a reservation-based access called Distributed Reservation Protocol (DRP) access as well as a random access called Prioritized Channel Access (PCA).

The DRP access foresees that devices announce their reservations in beacon frames in so-called DRP Information Elements (DRPIE) 600. Two alternatives of a DRP IE 620 and 640 are shown in FIG. 6A and 6B. Both are based on different versions of the MBOA specification, but are extended by fields that are defined in the present invention. All devices have to decode the DRP IEs included in the beacons of other devices and have to respect the reservations that are announced therein. A reservation usually applies to the current superframe 100 in which the beacon 201 with the respective DRPIE 600 is transmitted. A reservation can span over a multiple of MAS and can also be periodic with non-reserved slots in-between the reserved parts. A DRP reservation can be negotiated between sender and receivers of the planned transmission either explicitly by dedicated signalling messages or implicitly by only including a new DRPIE in the beacon of sender and receivers. In both cases, once the negotiation is completed, sender and receivers include a corresponding DRPIE 600 in their respective beacons 201 in all superframes 100, in which the reservation is active. This will inform other devices about the reservation and provide a free medium around the sender and the receivers at the reserved time.

The second type of medium access is the Prioritzed Random Access (PCA). This access method, which is very similar to IEEE 802.11e, is based on carrier sensing of the devices. If a device has data to transmit and the medium is sensed idle, the device can randomly access the medium after it has carried out a so-called backoff. The backoff is useful to spread the access of different devices in time and thereby reduce the collision probability of data frames. As the superframe is slotted into MAS 103, devices are only allowed to access, rsp. start their backoff at the beginning of a MAS 103. Furthermore, devices have to respect DRP reservations, which means that devices can only access MAS 103 with PCA that have not been reserved by DRP.

Methods, systems and apparatuses for dynamic MCS selection (also called "Link Adaptation") and Power Control include an efficient signalling mechanism. Receivers of a transmission send feedback to the sender of the transmission by means of beacon frames 201. These beacon frames may or may not be grouped into a beacon period 101, even though the grouping in a beacon period 101 is the preferred embodiment of the invention. The feedback can consist of incremental feedback, full feedback or channel state information. Every station periodically sends a beacon (e.g. every 65 ms), which allows for dynamic adaptation of the MCS and TX power at the sender.

Several examples are described in the following. Two different ways are provided to include feedback information in the beacon: Either the feedback is included in the DRP IE 600 or the feedback is transmitted in a distinct Feedback IE.

The distributed reservation protocol information element (DRP IE) 600 is included in the beacon if the device is either a sender or a receiver of a future DRP transmission in the data transmission phase 102 of this superframe 100. In an alternative, the DRP IE is also included in the beacons of direct neighbours of sender and receiver(s).

Two different examples of the format of the DRPIE are illustrated in FIGS. 6A/6B and 7A/7B respectively. FIGS.

6A/6B illustrate a format of the DRPIE with full MCS and TX power feedback, whereas FIGS. 7A/7B illustrate the case with incremental MCS and TX power feedback.

In the first example, a DRP IE is formatted as illustrated in FIG. 6A.

The Element ID field 601 identifies the information element as a DRP IE.

The Length field 602 gives the length of the DRP information element in number of octets. This is used in order to indicate the beginning of the next IE.

The DRP Control field 603 is illustrated separately in FIG. 6B and includes the following fields:

The ACK Policy field 631 defines the acknowledgment policy for the transmission in the intended reservation. It is encoded as in the MAC header, except that the 11 encoding is not to be used. The ACK policy field is decoded only if the DRP reservation is of type Hard or Soft.

The DRP Reservation Type field 632 indicates the type of the reservation and is encoded as shown in Table 1.

TABLE 1

Types of Reservations

| | |
|---|---|
| 001 | Hard Reservation |
| 010 | Soft Reservation |
| 011 | Private Reservation |
| 100-111 | Reserved |

The DRP Reservation Priority 633 indicates the priority of the transmission in the intended reservation, and takes on a value between 0 and 7, inclusive. The priority shall be chosen according to IEEE 802.1d Annex H.2.

The UP/StreamIndex field 634 indicates the user priority or stream of the data intended to use the DRP reservations indicated in this DRPIE. The StreamIndex identifies the data stream and is used to distinguish multiple streams between the same set of sender and receiver(s).

The RATE field 604 is defined in the present invention to allow a receiver to give feedback to the sender regarding the recommended data rate, rsp. MCS to be used by the sender. The RATE field could e.g. be encoded as shown in Table 2. In the beacon, rsp. DRPIE of the sender the RATE field 604 may be set to the actually used data rate in the respective superframe for the respective DRP, rsp. receiver.

TABLE 2

Data rates of different MCS and their bit code

| Rate (Mb/s) | Bit code | Value |
|---|---|---|
| 53.3 | 00000000 | 0 |
| 80 | 00000001 | 1 |
| 106.7 | 00000010 | 2 |
| 160 | 00000011 | 3 |
| 200 | 00000100 | 4 |
| 320 | 00000101 | 5 |
| 400 | 00000110 | 6 |
| 480 | 00000111 | 7 |
| Reserved | 00001000-11111111 | 8-15 |

The TX Power Level field 605 is defined in this invention to allow the receiver to give feedback to the sender regarding the recommended TX Power Level to be used by the sender. The TX Power Level could be encoded in a similar way than the data rate as an 8 bit combination. In the beacon, rsp. DRPIE of the sender the TX Power Level field 605 may be set to the actually used power in the respective superframe for the respective DRP, rsp. Receiver.

The Destination/Source DEVID field 606 is set to the DEVID of the receiver, multicast-group or broadcast, if the device is the sender of the DRP transmission, and set to the DEVID of the sender, if the device is a receiver of the DRP transmission. The Destination DEVID is decoded only if the reservation is of type Hard or Soft.

A DRP Reservation 607 contains the information on the reserved times, rsp. time slots inside the superframe. The encoding of this field is according to the MBOA MAC, rsp. updates of this specification. The specific way of encoding the reservation does not affect the essence of the present invention. A DRP IE may contain multiple DRP Reservation fields 607.1, ..., 607.N for the same DRP Control and Destination/Source DEVID.

In a second alternative in FIGS. 7A and 7B, the feedback is given as incremental feedback inside the DRPIE. The RATE 701 and TX Power 702 fields are put into the DRP Control field to illustrate that the feedback information can also be located there. Both fields could, e.g., be only a single or a few bits long to indicate whether the RATE, rsp. TX Power should be increased or decreased. In the example in FIG. 7B the RATE 701 and TX Power 702 fields have a length of two bits, which are encoded according to Table 3.

TABLE 3

Encoding of RATE 701 and TX Power 702 fields

| | |
|---|---|
| 00 | Do not change |
| 01 | Decrease |
| 10 | Increase |
| 11 | Reserved |

The TX Power (Level Change) field can also have a length of more than 2 bits and encode not only whether to decrease or increase the level but also by how much or how many levels. Such an alternative example of the TX Power field encoding is shown in Table 4.

TABLE 4

Alternative encoding of TX Power Field Encoding

| Value (b3-b0) | Power level change (in TxPowerSteps) |
|---|---|
| 1000-1101 | Reserved |
| 1110 | −2 |
| 1111 | −1 |
| 0000 | no change |
| 0001 | +1 |
| 0010 | +2 |
| 0011-0111 | Reserved |

The receiver decides whether the data rate, rsp. MCS and TX Power have to be changed in one direction or the other and gives a recommendation to the sender in the RATE 701 and TX Power 702 fields. In the beacon, rsp. DRPIE of the sender the RATE 701 and TX Power 702 fields could either be set to indicate how the sender has actually changed the data rate and TX Power or could not be used and e.g. be set to zero.

In both described embodiments of full and incremental feedback only one of the two fields RATE or TX Power Level/TX Power could be included in case that only feedback regarding one of the two parameters is defined.

The RATE and TX Power Level fields could be always included in a DRP IE or could be made optional. The latter might require that their position inside the DRP IE is defined differently. It should be mentioned that the DRP IEs shown in FIG. 6A/6B and 7A/7B are only illustrative. A different way of including the RATE and TX Power Level recommendations is also possible.

In a third embodiment the DRPIE includes information regarding the channel state at the receiver. This channel state information may e.g. be chosen out of the set of Received Signal Strength (RSS), Signal to Noise Ratio (SNR) and Packet Error Ratio (PER). No additional figure to FIGS. 6 and 7 is included here, as the inclusion of the channel state information in the DRPE would be carried out in an analogous way than in the two previous embodiments (RSS, SNR or PER instead of or in addition to RATE and TX Power).

In a second set of examples of the present invention, the feedback information is not transmitted as part of the DRPIE but as one or several separate Information Elements. Transmitting link feedback in its own IE has the advantage that feedback can not only be given for DRP streams (as with the DRPIE) but also for PCA streams. The case that the feedback is sent in one single Link Feedback IE (LFIE) is described in the following. The analogous examples can include when several IEs are included, e.g. one Rate IE and one TX Power IE. The following examples differ again in what kind of feedback the receiver sends to the sender (full, incremental or channel state).

In a fourth example of the present invention a Link Feedback IE (LFIE) 800 is included in the beacon of the receiver to give feedback to the sender regarding the appropriate choice of data rate/MCS and/or TX Power. A possible structure of the LFIE 800 is shown in FIG. 8. The LFIE comprises the following fields:

The Element ID field 801 identifies the information element as a LFIE.

The Length field 802 gives the length of the DRP information element in number of octets. This is used in order to indicate the beginning of the next IE.

The TX/RX DEVID field 803 indicates the DEVID of the communication partner. The receiver includes the DEVID of the sender in its beacon, rsp. LFIE. The sender may also include the LFIE in its beacon for the purpose of indicating its actually used RATE and TX Power, in which case the DEVID is set to the DEVID of the receiver.

The TX Power Level field 804 encodes the TX Power Level e.g. with 8 bit. The field indicates the recommended value in case of the receiver LFIE and the actually used value in case of the sender LFIE.

The RATE field 805 includes the recommended data rate, rsp. MCS to be used by the sender. The RATE field could e.g. be encoded as shown in Table 2. In the beacon, rsp. LFIE of the sender the RATE field 805 may be set to the actually used data rate in the respective superframe for the respective stream, rsp. receiver.

The UP/StreamIndex field 806 indicates the user priority (especially for PCA) or stream index (especially for DRP) of the stream for which the feedback is given. If all streams between a certain set of sender and receiver devices employ the same RATE and TX Power (because they are all transmitted on the same link), the UP/StreamIndex field 806 can also be omitted, rsp. removed.

The order of the fields could also be different or fields could be removed or additional fields could be added. For example, FIG. 11 depicts an example of a LFIE format 800 which includes Element ID field 801, Length field 802 and at least one link field 1100. FIG. 12 depicts link field 1100 as containing rate field 805, TX Power Level field 804, and a DevAddr field 1200 which includes information of the source device for which the feedback is provided.

In a fifth example the link feedback is also transmitted by means of an LFIE, but incremental recommendations are given in the LFIE instead of full recommendations. A first possible structure of the LFIE according to this embodiment is shown in FIG. 9. The Element ID 801, Length 802, TX/RX DEVID 803 and UP/StreamIndex 806 fields are not changed compared to the previous embodiment. The UP/StreamIndex 806 is put at a different position inside the LFIE in FIG. 9 compared to FIG. 8 but, as mentioned before, the order of the fields inside the LFIE could also be defined differently and the UP/StreamIndex may even not be needed. A second possible structure of the LFIE with incremental feedback would again be the one shown in FIG. 11 and FIG. 12.

The difference to the fourth example is that the RATE 901 and TX Power 902 fields contain relative feedback, i.e. whether the RATE and/or TX Power should be increased, decreased or kept unchanged. They may e.g. be encoded according to Table 3 or Table 4.

In a sixth example the link feedback is also transmitted by means of an LFIE, but this LFIE does not include RATE and TX Power but channel state information. This channel state information may e.g. be chosen out of the set of Received Signal Strength (RSS), Signal to Noise Ratio (SNR), Noise Level (N) and Packet Error Ratio (PER). No additional figure to FIGS. 8 and 9 is included here, as RSS, SNR, N or PER fields would simply replace the RATE and TX Power fields (with different field lengths) in the LFIE. An advantage of giving feedback in form of channel/link state information (in the DRPIE or a separate IE) is that the receiver does not need to have any information regarding the TX parameters on the sender side. The sender will take the decision on rate/MCS and TX power autonomously based on the channel state feedback from the receiver. In the embodiments in which the receiver sends and explicit recommendation to the sender, the receiver may require some information regarding the TX parameters, like e.g. the TX power used by the sender, in order to determine recommended values to the sender. This is why, especially for the full MCS and TX power recommendation of the TX power, the sender also includes the current TX power in its beacon.

A combination of any or all of the previous examples is possible. This may mean, e.g., full feedback in the sender beacon and incremental feedback in the receiver beacon or any combination of RATE, TX Power and channel state parameters.

A device may use the Link Feedback IE to suggest the optimal data rate to be used by a transmitter, for example, to increase throughput and/or to reduce the FER. The rate in the Link Feedback IE should be interpreted as the maximum data rate that the transmitter should use for this particular link, so that FER have acceptable value. The transmitter may not follow the recommendation.

A receiver may recommend a power change to be used by the transmitter by including a LFIE in its beacon.

Figure 10:
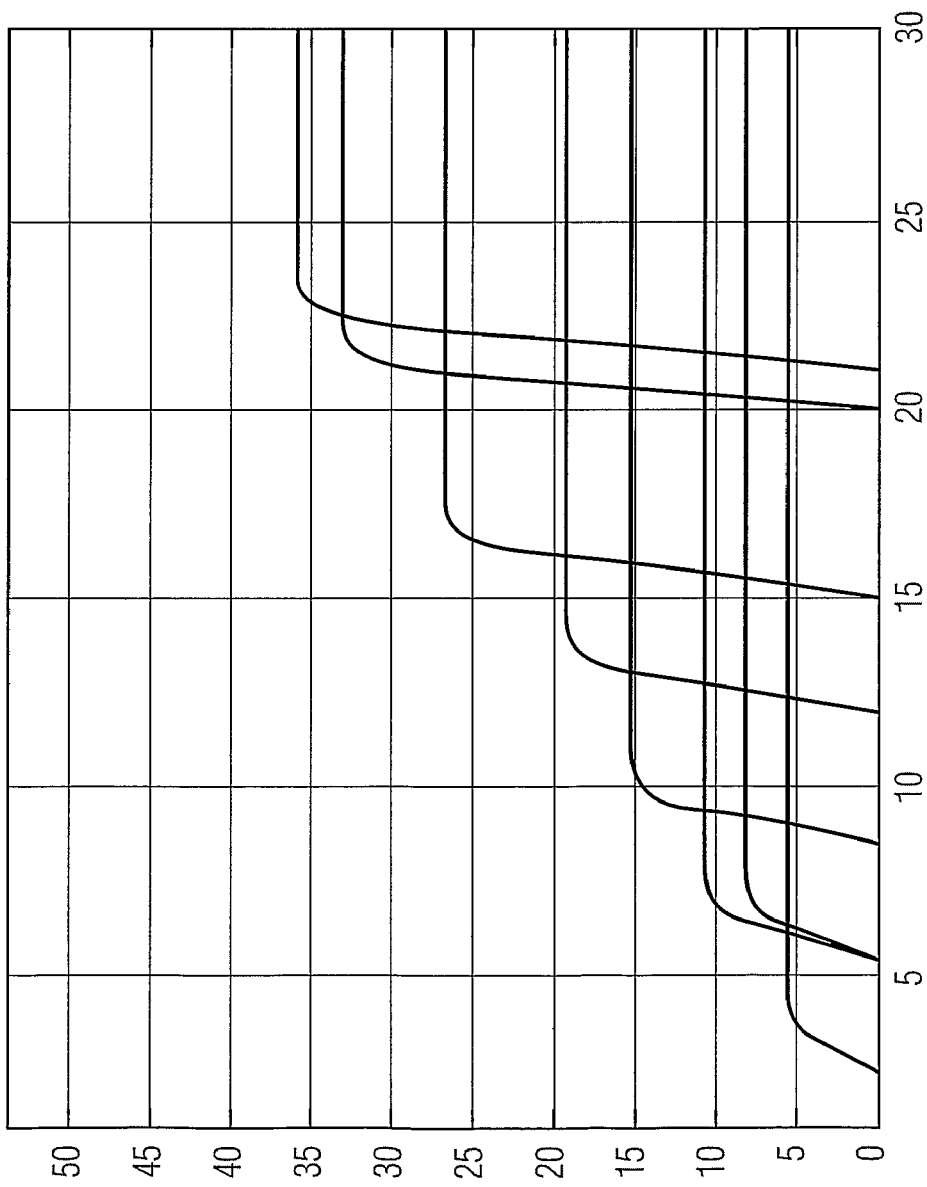
FIG. 10 illustrates an example of the relationship between data rate and signal to noise ratio.

Finally, an illustrative example is given in the following how a receiver can take the decision on an appropriate RATE or TX Power recommendation for the sender. The receiver can select the RATE and/or TX Power based on different criteria, examples of which are data throughput, packet delay, Packet Error Ratio, etc. A typical basis for the decision is the data throughput. The data throughput mainly depends on the MCS chosen for the transmission and the number of retransmissions. This is illustrated in FIG. 10 for the example of a Wireless Local Area Network (WLAN) according to the standard IEEE 802.11a. A similar figure could be derived for an UWB physical layer.

FIG. 10 shows that the data throughput is a function of the Signal to Noise Ratio (SNR), which is mathematically designated as $E_{av}/N_0$ in FIG. 10. In IEEE 802.11a there are 8 different MCS with data rates of 6, 9, 12, 18, 24, 36, 48 and 54 Mbit/s respectively. The higher the data rate that is achievable on physical layer, the less robust is the transmission. A lower robustness means that the achievable throughput drops at a higher SNR, as can be depicted from FIG. 10. Taking the example of the lowest curve for a data rate 6 Mb it/s the throughput drops when the SNR falls below a level of approximately 4 dB. For the highest data rate of 54 Mbit/s the throughput already drops at and SNR of approximately 23 dB. The dropping of the throughput is due to retransmissions that have to be carried out when the data can no longer be reliably transmitted with a certain MCS.

A strategy that maximizes the throughput would be to switch the MCS/data rate at the intersection points of two neighboring MCS, i.e. at certain SNR levels. The resulting throughput versus SNR would be the envelope of all curves in FIG. 10, i.e. the maximum of all curves at a given SNR. A certain MCS/data rate would thus be employed in a predetermined SNR interval. The receiver just has to calculate the current SNR and to read the appropriate MCS/data rate from a table in its local storage.

This is just one example how the receiver can derive a recommendation to give as feedback to the sender. The TX power level can be determined in a similar way e.g. based on PER, RSS or also SNR. The sender could just use the MCS and TX Power that the receiver has recommended or could carry out an own estimation of the optimal MCS and TX Power and just use the recommendation of the receiver as one input for taking its decision.

While the examples of the present invention have been illustrated and described, it will be understood by those skilled in the art that the management frame, device architecture and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention includes all embodiments falling with the scope of the appended claims.

What is claimed is:

1. A method of dynamically selecting at least one of a data rate and transmit (TX) power in a distributed communications network including a plurality of devices comprising:
   at the receiving device, dividing time into a sequence of at least one superframe;
   including, at the receiving device, a feedback in a beacon such that a Distributed Reservation Protocol Information Element (DRPIE) is modified in the beacon to include at least a feedback field, said feedback comprising information related to the selection of the at least one data rate and transmit power;
   transmitting, at the receiving device, the beacon including the modified DRPIE in the superframe, wherein said feedback is designated in the feedback field of the modified DRPIE, and future reservations for at least said receiving device are designated in a reservation field of the modified DRPIE; and
   at the transmitting device, selecting the at least one of data rate and transmit power based at least in part on the feedback from the receiving device, wherein each of the receiving device and the transmitting device is any device in the distributed communications network.

2. The method of claim 1, wherein said feedback further comprises at least one of: a full feedback comprising at least one of a recommended level of data rate and a recommended level of TX Power; an incremental feedback comprising a recommended relative change of the at least one of data rate and TX Power; a state or quality of a link feedback; and a number of antennas or steering of an antennas beams feedback.

3. The method of claim 2, wherein the state or quality of link feedback further comprises at least one of:
   Signal to Noise Ratio (SNR);
   Received Signal Strength (RSS);
   Noise level (N);
   Packet Error Ratio;
   Bit Error Ratio;
   Path loss; and
   any other characteristic of the quality of the channel or reception.

4. The method of claim 2, wherein said incremental feedback is given as a bit combination, which indicates any one of:
   the at least one data rate and TX Power should be increased;
   the at least one data rate and TX Power should be decreased;
   and the at least one data rate and TX Power should not be changed.

5. The method of claim 4, wherein said incremental feedback also includes by how much, respectively how many steps, the at least one data rate and TX Power should be changed.

6. The method of claim 1, further comprising the steps of:
   including information in the beacon regarding the current, past or future transmit parameters; and
   determining a recommendation for the at least one of data rate and TX Power at least in part based on the information.

7. The method of claim 6, wherein said transmit parameters further comprise at least one of: TX power, data rate, modulation scheme, coding scheme, number of antennas, Multiple Input Multiple Output (MIMO) or beam steering parameters, a parameter characterizing current, past, or future transmission transmissions.

8. The method of claim 7, wherein the at least one data rate and TX power are defined in steps and their value is encoded as a bit combination.

9. The method of claim 6, wherein the beacons of devices in a superframe are grouped into at least one Beacon Period (BP).

10. The method of claim 6, wherein said information is transmitted as part of an existing Information Element (IE) of the beacon.

11. The method of claim 10, wherein said existing IE of the beacon is a Distributed Reservation Protocol Information Element (DRPIE), which is also used for reserving the medium for a future transmission.

12. The method of claim 6, wherein said information is transmitted in a separate Information Element of the beacon.

13. The method of claim 1, wherein said feedback is transmitted in a separate Information Element of the beacon.

14. The method of claim 13, wherein said separate Information Element of the beacon is selected from the group consisting of:
   Link Feedback Information Element (LFIE) comprising feedback selected among said group of options;

Power Control Information Element (PCIE) comprising full or incremental feedback regarding the TX Power;

Rate Control Information Element (RCIE) or Link Adaptation Information Element (LAIE) comprising feedback regarding at least one of the data rate, a modulation scheme, and a coding scheme;

MIMO Information Element (MIMOIE) Beamforming Information Element (BFIE) comprising feedback regarding the number of antennas or steering of antennas beams; and a combination of the previous options.

15. The method of claim 1, wherein the at least one data rate and TX power are defined in steps and their value is encoded as a bit combination.

16. The method of claim 1, wherein said feedback in a beacon consists of feedback for all links of the receiving device.

17. A wireless device operable in a distributed communications network, comprising:
  a transmitter for transmitting own device beacons and data;
  a receiver capable of communication over a wireless medium;
  a processor;
  a Beacon Processing Module;
  a local storage;
  wherein the processor is configured to receive from the receiver a beacon frame including a feedback related to the selection of at least one of a date rate and transmit power, and further to select at least one of the data rate and transmit power for a certain link, based at least in part on the feedback, wherein said feedback is designated in a feedback field of a modified Distributed Reservation Protocol Information Element (DRPIE), and future reservations are designated in a reservation field of the modified DRPIE.

18. The wireless device of claim 17, wherein the Beacon Processing Module processes the feedback to determine at least one property of another device and store them in the local storage.

19. The wireless device of claim 17, wherein the device detects beacon collisions by:
  scanning beacon slots; and
  decoding a Beacon Period Occupancy Information Element (BPOIE) in beacons transmitted by other devices.

20. The wireless device of claim 17, wherein the processor is operatively coupled to
  said Beacon Processing Module and configured to divide the medium into a sequence of at least one superframe comprising a slotted beaconing period and a data transfer period, to process beacons and data received respectively therein, and format and control own beacons and own data to be transmitted respectively therein;
  said receiver and transmitter and configured to respectively control receipt and transmission of beacons thereby during said slotted beaconing period and to respectively control data rate and transmit power during said data transfer period.

* * * * *